United States Patent [19]

LeBlanc et al.

[11] Patent Number: 4,913,096
[45] Date of Patent: Apr. 3, 1990

[54] ANIMAL FEEDER

[76] Inventors: Stacy A. LeBlanc; William E. LeBlanc, both of 601 Misty La., Friendswood, Tex. 77546

[21] Appl. No.: 116,896
[22] Filed: Nov. 5, 1987
[51] Int. Cl.⁴ .............................................. A01K 5/00
[52] U.S. Cl. .................................. 119/53.5; 119/56.1
[58] Field of Search .................. 119/53.5, 53, 54, 18, 119/56.1

[56] References Cited

U.S. PATENT DOCUMENTS

| 2,969,769 | 1/1961 | Paschall | 119/56 R |
| 3,204,608 | 9/1965 | Snitz | 119/54 |
| 3,279,434 | 10/1966 | Evans | 119/56 R |
| 3,340,851 | 9/1967 | Frank et al. | 119/56 R |
| 3,727,584 | 4/1973 | Permann | 119/56 R |
| 4,050,415 | 9/1977 | Conger | 119/56 R X |
| 4,256,054 | 3/1981 | Hitchcock | 119/56 R X |
| 4,422,409 | 12/1983 | Walker et al. | 119/56 R X |
| 4,497,280 | 2/1985 | Sanstrom et al. | 119/56 R X |
| 4,770,125 | 9/1988 | Gold et al. | 119/53.5 |

Primary Examiner—Robert P. Swiatek
Assistant Examiner—Todd E. Manahan
Attorney, Agent, or Firm—Robert W. B. Dickerson

[57] ABSTRACT

A mechanism for permitting enclosed animals, such as laboratory specimens, to arbitrarily cause a portion of food to be available; the mechanism includes an activating member, a first cam-activated, trip member operating as a function of the activating member, and a delay mechanism for periodically disrupting the activation of the trip member by the activating member.

5 Claims, 4 Drawing Sheets

ANIMAL FEEDER

BACKGROUND OF THE INVENTION

Animals are enclosed for a variety of purposes. Examples of such environments include zoos as well as scientific or medical laboratories. In either case, especially the latter, a two fold problem occurs. First, there is a need for periodic feeding, preferably without the need for an attendant to be present each time. Second, boredom is a constant problem. In the absence of activities, confined animals, such as baboons, may actually harm themselves, by extracting their own hairs. This invention was developed so as to reduce both problems, ie, to make available a source of food, and to allow the enclosed creature to experience its own sensations by activating such source.

SUMMARY OF THE INVENTION

An enclosure is adapted to be removably secured to a supporting structure, such as cage bars. Interior of the enclosure, an open-mouthed receptacle receives morsels of food. A user-activatable trip mechanism rotates a pair of toothed gears, such that the gears, by acting on levers, cause (11) food supply agitation, (21) food supply restriction, and (31) food supply distribution. By designing one of said gears to be of the skip-tooth variety, a built in periodic failure of the food supply distribution phase is assured. Spring return means are provided to recycle the apparatus.

DESCRIPTION OF A PREFERRED EMBODIMENT

Figure 2:
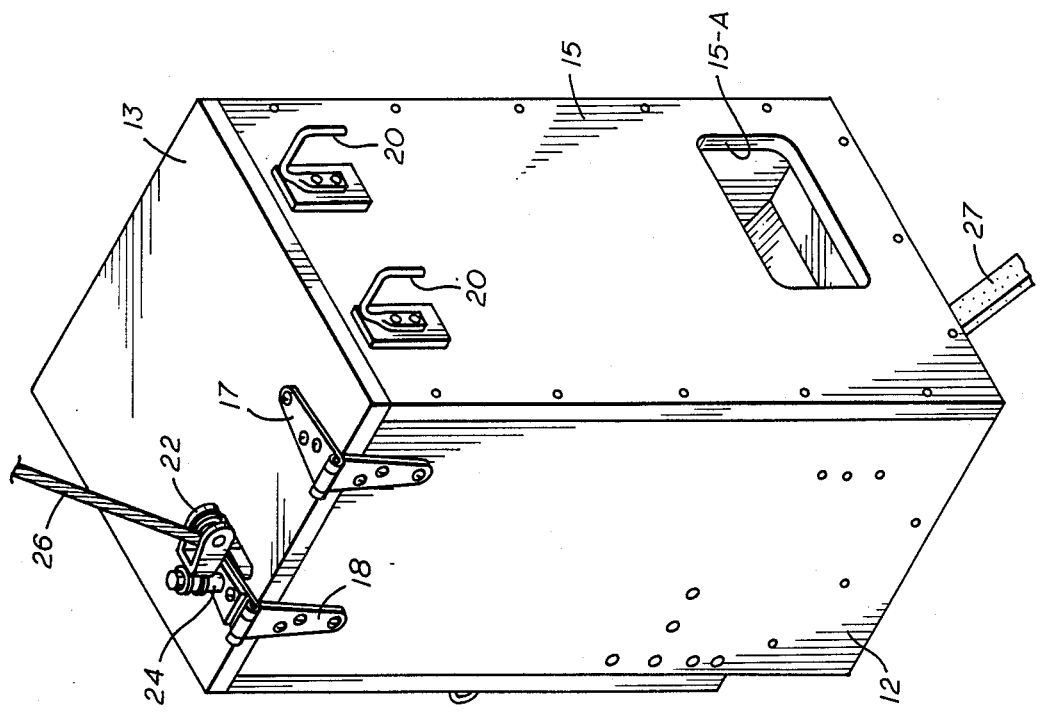
FIG. 2 is a perspective of the closed housing.
Figure 1:
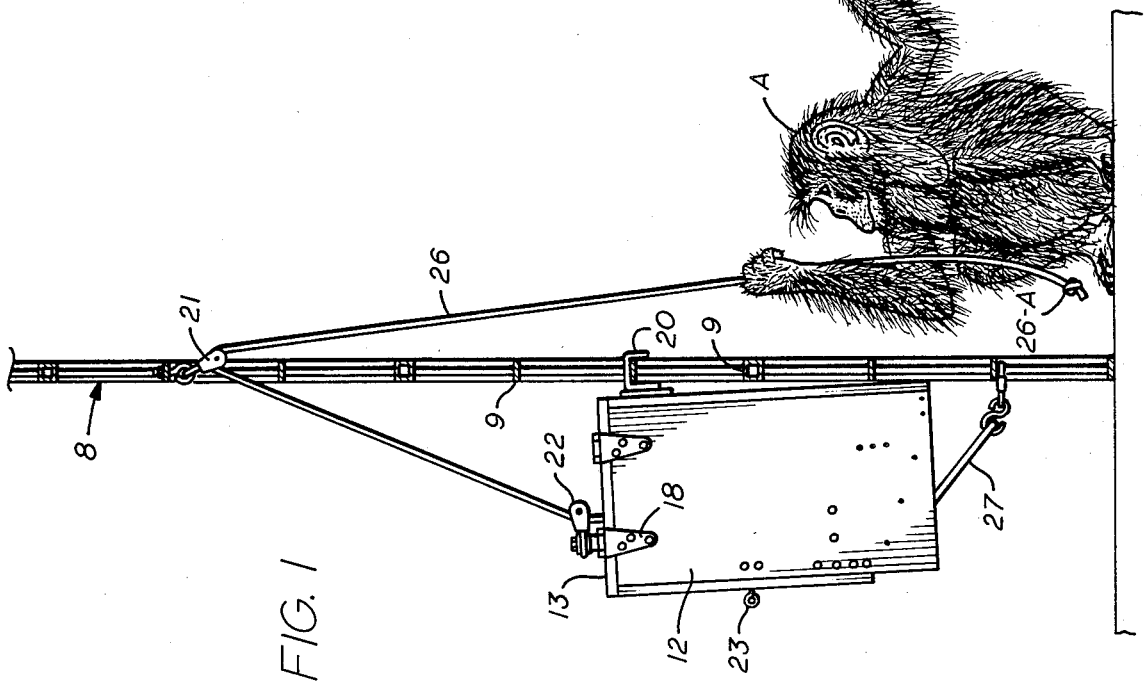
FIG. 1 is a partly schematic, side elevation of the feeder, positioned on a cell wall.
Figure 3:
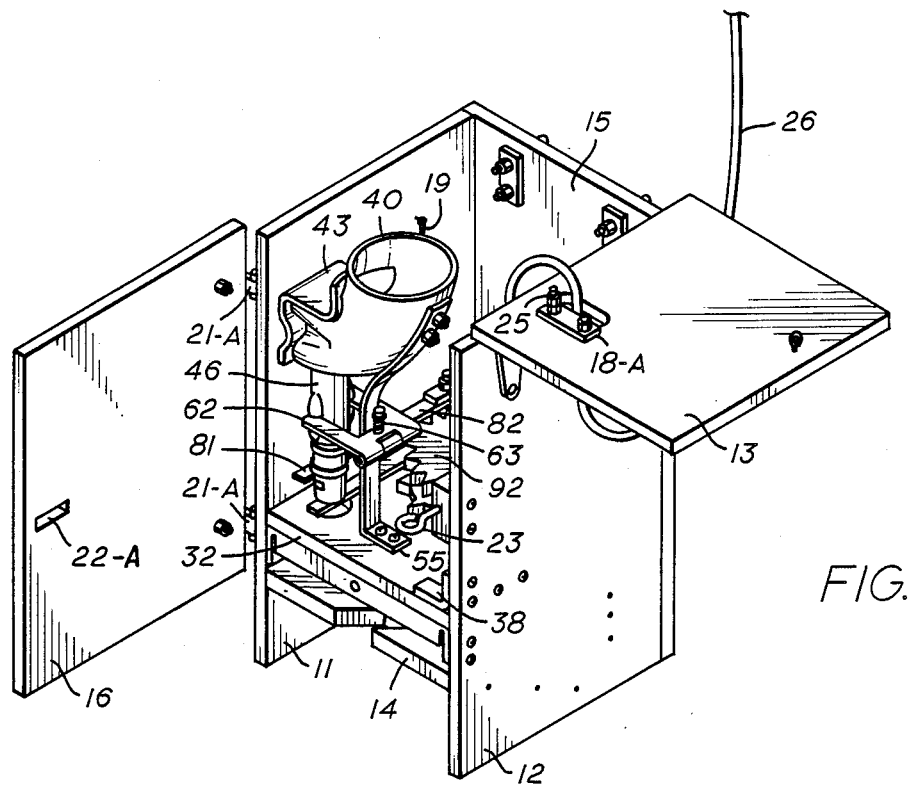
FIG. 3 is a perspective of the open container.

A box-like enclosure 10 serves as the housing for the feed mechanism of this invention. Said housing includes opposed vertical side walls 11, 12, hinged cover 13, inclined bottom 14, front wall 15, and rear door 16. As illustrated, front wall 15 includes an aperture 15-A therethrough. This aperture permits an animal "A" to reach therethrough to grasp a morsel of food. Cover 13 may be hingedly secured to side wall 12, as by hinges 17, 18. A latch mechanism 19 may releasably secure said cover 13 to side wall 11. Rear door 16, which may be fabricated of a clear plastic material, is hinged to side wall 11, by vertically spaced hinges 21-A. Aperture 22-A permits locking member 23 to releasably secure said rear door 16 to side wall 12.

Consider now, the food release mechanism. Hinge mechanism 18 is reinforced by plate 18-A, positioned on the underside of cover 13. Hooks 20, secured to front wall 15, are used to suspend enclosure 10 from horizontal bars 9 of cell wall 8. Also pivotally secured to a bar is pivot-swivel 21. Housing swivel 22 is pivotally linked to cover 13, via its pivot ring 23 rotatably encircling threaded post 24. Said post would pass through aligned apertures (not shown) in hinge 18, cover 13, and reinforcing plate 18-A, to be secured, at said cover's underside, by nut 25.

Rope, or similar grasping member 26, may be grasped near one end by the animal-user, "A". Said one end may be knotted, as at 26-A, to form a handle or otherwise facilitate grasping. After passing through pivot and housing swivels 21, 22, respectively the other end of rope 26 is secured to lever 31-A of ratchet 31 of the trip mechanism via internval swivel 34, hereinafter described. In some circumstances, upper pivot swivel 21, may be eliminated. Strap 27, secured to bottom 14, may be removably tethered to vertical bars of cell wall 8, to prevent disengagement of the housing from said wall when a downward force is exerted by user "A" on rope 26.

Figure 6:
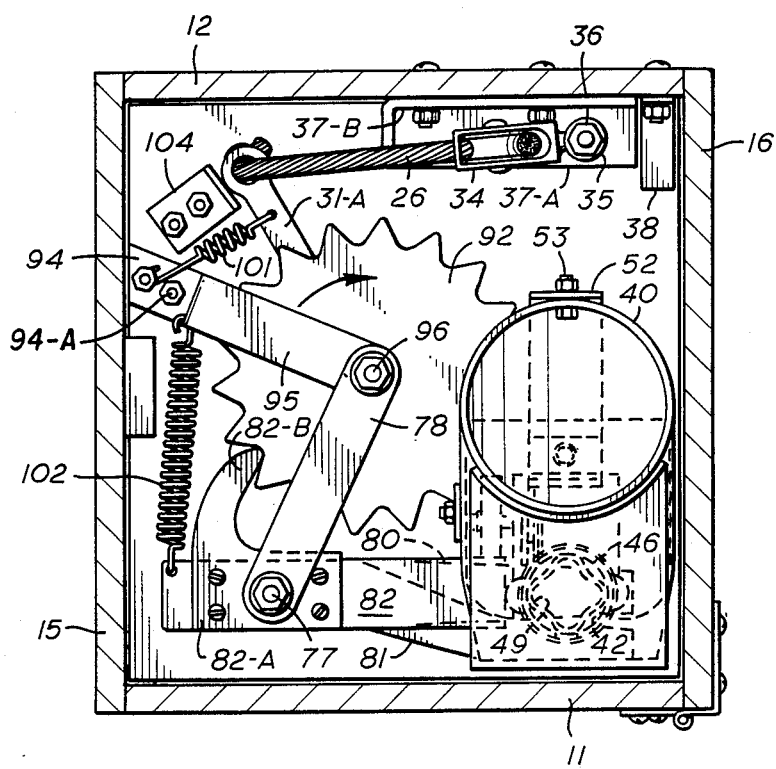
FIG. 6 is a sectional view taken along lines 6—6 of FIG. 5.
Figure 4:
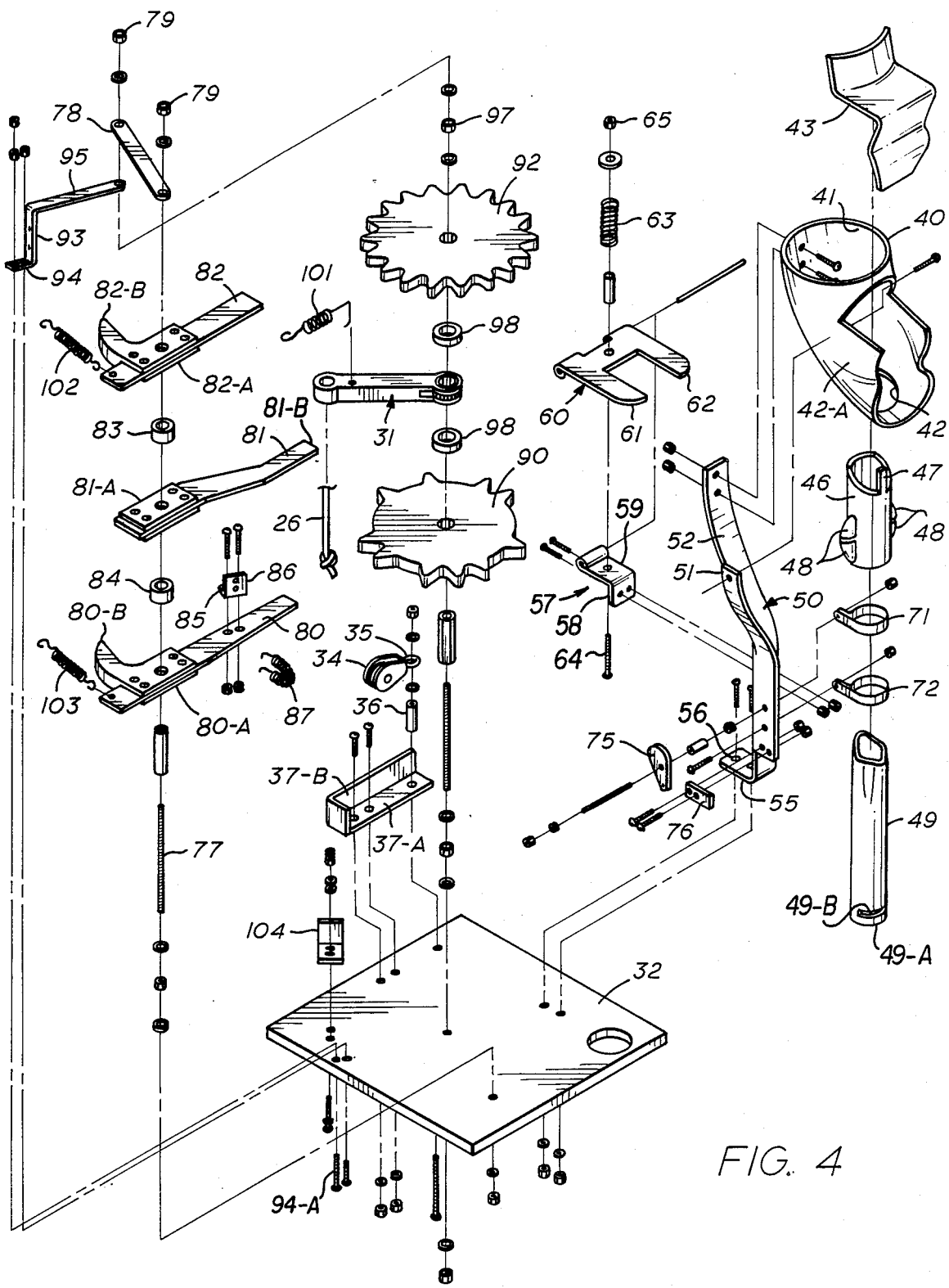
FIG. 4 is an exploded perspective of the trip mechanism.
Figure 5:
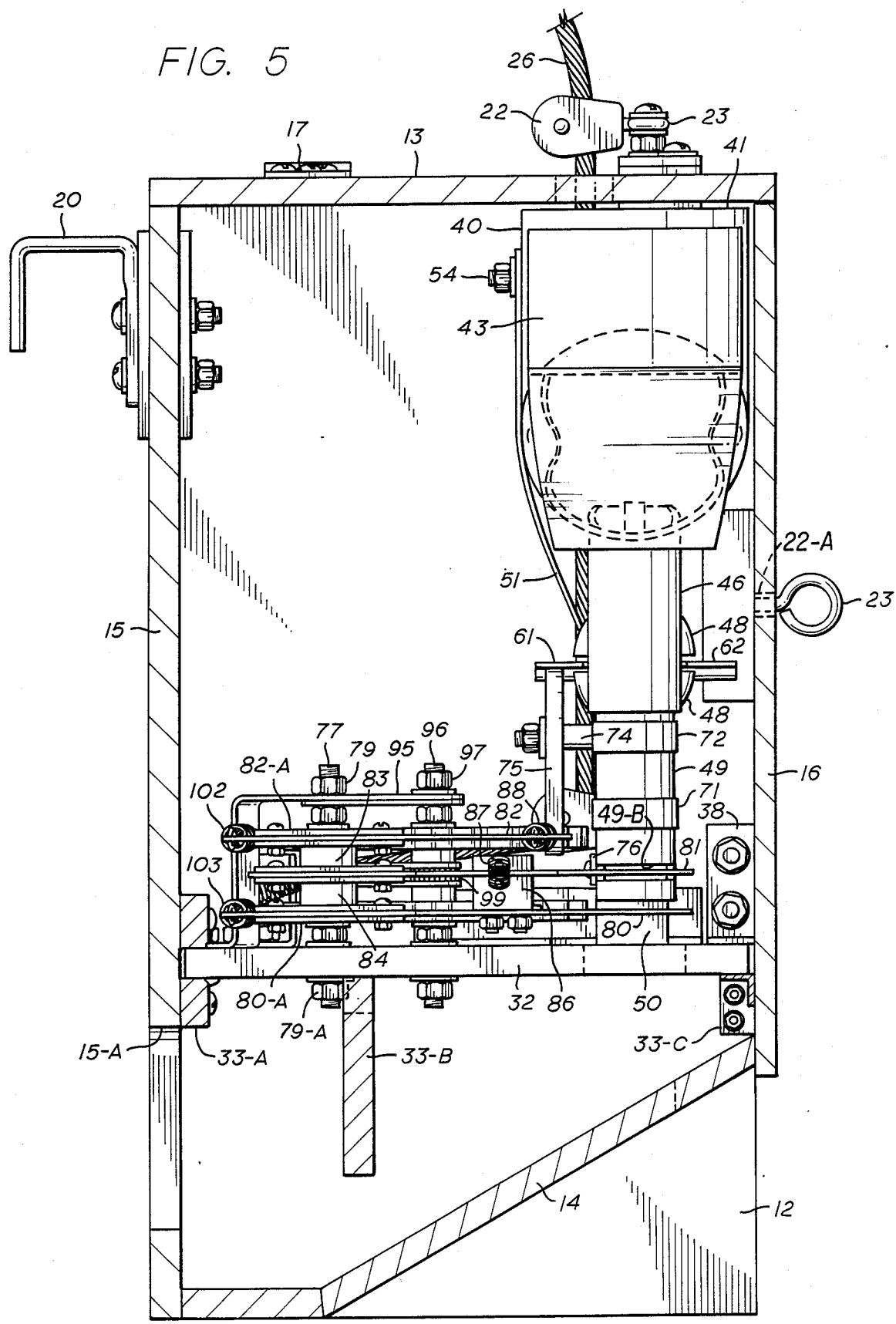
FIG. 5 is a side elevation of the housing, with a side wall removed.

Consider now the trip mechanism, as best illustrated in FIGS. 4, 5, and 6. Floor 32 is secured to lateral bracing 33-A, B, C, which are secured to the vertical walls of the housing. Internal swivel 34 includes swivel ring 35, which ring is rotatably secured to post 36. Said post 36 is, in turn, secured to floor 32 by a nut, not shown, after passing through plate 37-A of a bracket. Upstanding flange 37-B of said bracket is bolted to side wall 12. Bracing, in the form of L-shaped bracket 38 secured to wall 12, opposes lateral forces that may be generated.

Food reservoir 40 includes inlet 41, outlet 42 and front cover 43 removably secured to reservoir 40. Downwardly extending from, and communicating with outlet 42 is hollow, cylindrical agitator 46. Said agitator has axial (vertical) mobility, and includes an upstanding tooth 47 that extends within trough portion 42-A of reservoir 40. Said agitator 46 also includes depending, oppositely disposed, spaced, pairs of lugs 48. Interiorly concentric with agitator 46 is hollow tube 49, which may have a somewhat crusiform configured I.D. Near the lower end 49-A of tube 49, the wall thereof is cutaway, leaving a hemi-cylindrical slot 49-B therein.

Reservoir 40 is secured to floor 32 by L-shaped bracket 50. Said bracket has bifurcated legs 51, 52. One leg 52 is secured to reservoir inlet portion 41 by fastener 53; the other bracket leg 51 also being secured to said inlet portion 41 by fastener 54. Said bracket 50, in turn, has a base portion 55 which is bolted to floor 32 through base apertures 56, by bolts not numbered.

An L-shaped bracket 57 has flange 58 bolted to the unitary portion of bracket 50. Web 59 of bracket 57 is, in turn, hinged to wing housing 60. Depending from opposite ends of wing housing 60 are a pair of activator wings 61, 62. Said wings each extend through the space intermediate the respective pairs of agitator lugs 48. While said wing housing, and its depending levers, may pivotally move, relative to bracket web 59, said wing housing is biased toward engagement therewith by spring 63 seated between hut 65 and wing housing 60. Said bolt 64 passes through aligned apertures in housing 60 and web 69 to be bolted in place by said nut 65.

Collars 71, 72 clampingly encircle hollow tube 49, to restrain its movement. Said collars are each fastened to the unitary portion of bracket 50, by fasteners.

Rotatably secured to and near the base portion of bracket 50, and separated therefrom by spacer 74, is cam 75. Also fastened to bracket 50, near its base 55, is blocking plate 76.

Three levers 80, 81 and 82, are rotatably secured to floor 32 by rod 77, threaded at each end. Said rod 77 is secured to one end of plate 78 by nut 79, and to said floor by similar nut 79-A. Spacers 83, 84 separate encircle rod 77 and separate lever housings 82-A from 81-A, and 81-A from 80-A, respectively. Lever housings 82-A and 80-A each have tang extensions 82-B and 80-B, respectively, for engagement with toothed gears 92 and 90, respectively.

An L-shaped bracket has base 85 and back 86, said base being fastened to lever 80. Spring 87 encircles lever 81, which rests against bracket back 86. Said springs ends are secured to apertures in bracket back 86. By virtue of said spring, lever 81 acts as a follower to the movement of lever 80.

Lever 82 stops short of tube 49, rides against cam 75, and is yieldably secured to said cam by spring 88. Lever 81 has its end 81-B enter slot 49-B, thereby partially blocking downward passage through tube 49. Lever 80 movably blocks passage through the lower end 49-A of tube 49.

Bracket 93 has its base 94 bolted to floor 32 by fasteners 94-A, and its leg 95 rotatably secured to post 96 by nut 97. Said post is also rotatably secured, at its other threaded end to floor 32 by similar bolts 97. The other end of plate 78 is rotatably secured to said post 96, atop bracket leg 95.

Said previously mentioned gears 90 and 92, are each keyed to the central portion of post 96 so as to each be rotated therewith, in tandem. Said gears may be separated by spacers 98, the engaging end 99 of ratchet 31 engaging post 96 intermediate said spacers 98, for unidirectional movement of post 96 in the arrow's direction of FIG. 6. Note that lower gear 90 has one or more missing teeth.

Spring 101 connects ratchet handle 31-A with one of fasteners 94-A, so as to bias said handle toward said fastener 94-A. Bracket 104 acts as a stop for ratchet handle 31-A. Said bracket is bolted to floor 32. Additional springs 102, 103 connect levers 82, 80 to the central web of bracket 93.

Consider now the operation of the invention. With the housing positioned astride cross bars 9, by virtue of hooks 19, and secured by strap 27, rope 26 is dangled within the area proximate to the laboratory animal "A". When such user tugs on the rope, the force is transmitted, by virtue of pulleys 21, 22 and 34, to the handle 31-A of ratchet 31, moving it to the right in FIG. 6, against the force of spring 101. The engaging end 99 of said ratchet rotates post 96 in the direction of the arrow in said figure, carrying along gears 90, 92 which are keyed to said post. Such arcuate motion disengages tangs 80-B and 82-B from the valley between adjacent teeth of gears 90, 92, respectively, against the force of springs 102, 103. The other ends of said levers 80, 82 rotate opposite to the direction of the arrow. Said other end of lever 82 rotates cam 75 about its axis, causing said cam to urge wings 61, 62 to pivot upwardly, about their hinges, thereby pressing against the upward pair of agitator lugs 48, as to facilitate downwardly free flow of food morsels provided food reservoir 40. Said other end of lever 81 (carried along with lever 80 by spring 87), enters tube slot 49-B, so as to appropriately limit the number of food morsels that may exit through the open bottom 49-A of tube 49. Finally, said other end of lever 80, *except* when tang 80-B is riding in a toothless area of gear 90, moves from its normal position blocking open end 49-A of tube 49, to an unblocking position permitting a food morsel in the lower reaches of tube 49 to gravity fall against included housing bottom 14 and adjacent front wall aperture 15-A, available to be grasped by user "A". The presence of toothless areas of gear 90 programs an animal for occasional failure. In such instances, said other end of lever 80 does not unblock tube end 49-A, and no food is dropped therefrom. But for this feature, if a malfunction occurred, the laboratory animal might react violently, damaging the mechanism, and/or injuring itself. When the gears advance one tooth, or its arcuate equivalent in the case of gear 90, springs 102, 103 urge tangs 80-B and 82-B into the next adjacent valley, spring 101 urges the ratchet handle against the stop mechanism comprising bracket 104, bracket back 86 causes lever 81 to follow lever 80 to its rest position, and spring 88 causes cam 75 to return with lever 82 to its rest position thereby returning agitator 46 to its rest position. Thus, the invention is ready to commence another cycle, on the user "A" again tugging on rope 26.

Although only a single embodiment has been disclosed, it should be obvious that numerous modifications are possible by one skilled in the art without departing from the spirit of the invention, the scope of which is limited only by the following claims.

We claim:

1. An animal feeder having a food distribution mechanism, said feeder comprising:
   a housing means for supporting said food distribution mechanism;
   said food distribution mechanism including:
     a food reservoir;
     a means for dispensing food particles from said reservoir,
     said dispensing means including:
       a means for transmitting a force exerted by a user to
       a force translating means,
       a means for translating said user exerted force into rotational movement of a control mechanism comprising a plurality of toothed gears, and
       a spring-biased lever means, activated by said gears comprising said control mechanism, for regulating the exit of food particles from said food reservoir and for restricting the quantity of such particles exiting said reservoir as a result of said user exerted force; said lever means including (1) a first lever being normally positioned in an exit-blocking position, and movable, under a force exerted thereupon by one of said toothed gears, to a non exit-blocking position, (2) a second lever adapted to regulate the quantity of food exiting said reservoir, said second lever being movable as a function of the movement of said first lever, and (3) a third lever movable under a force exerted thereon by another of said toothed gears from a non food agitating position to a food agitating position.

2. An animal feeding mechanism comprising:
   a housing for a food dispensing mechanism, said housing
   including a passageway means for exiting food particles
   therefrom;
   said food dispensing mechanism includes:
     a food reservoir having an entry and an exit,
     a force transmission means for transmitting a force exerted by a user to a force translation means, said force translation means translating said user exerted force into rotational movement of a gear means, said gear means comprising a pair of toothed gears secured for unitary rotation, one of said gears being of the skip tooth variety, whereby periodic failure of the dispensing mechanism may occur, a plurality of levers, each being secured for rotation about a post, said post being secured to said housing, two of said levers carrying means for permitting lever rotation as a function of rotation of an associated one of said gears, one of said two levers comprising means for unblocking said reservoir exit, and the other of said two levers comprising means for limiting the quantity of food permitted to pass through said reservoir exit during a single cycle.

3. The mechanism of claim 2 and including a housing bottom and a means for removably securing said housing to bars of a wall, said securing means including a plurality of hooks adjacent said passageway means, and a tethering strap attached to the said bottom of said housing.

4. The mechanism of claim 2 and including a food agitator means, said agitator means including a further one of said levers, cam means rotatable by one end of said further lever, an axially movable tubular member extending within said reservoir exit, and an oscillating means activated by said cam means, intermediate said cam means and said axially movable tubular member.

5. The mechanism of claim 2 wherein said force translation means includes a ratchet means rotatably secured at one end to a post member carrying said gear means.

* * * * *